US012595880B2

(12) United States Patent (10) Patent No.: US 12,595,880 B2
Jakobuco (45) Date of Patent: Apr. 7, 2026

(54) AUTOMATIC HOLDER WITH SUCTION CUP

(71) Applicant: Christophe Jakobuco, Guangzhou (CN)

(72) Inventor: Christophe Jakobuco, Guangzhou (CN)

( * ) Notice: Subject to any disclaimer, the term of this patent is extended or adjusted under 35 U.S.C. 154(b) by 0 days.

(21) Appl. No.: 18/754,410

(22) Filed: Jun. 26, 2024

(65) Prior Publication Data

US 2024/0344656 A1 Oct. 17, 2024

(30) Foreign Application Priority Data

Jun. 5, 2024 (CN) .......................... 202421270558.7

(51) Int. Cl.
| | |
|---|---|
| *F16M 13/02* | (2006.01) |
| *B60R 11/02* | (2006.01) |
| *F16B 47/00* | (2006.01) |
| *B60R 11/00* | (2006.01) |

(52) U.S. Cl.
CPC ....... *F16M 13/022* (2013.01); *B60R 11/0241* (2013.01); *F16B 47/00* (2013.01); *B60R 2011/0056* (2013.01)

(58) Field of Classification Search
CPC .... F16M 13/022; F16M 11/041; F16M 11/10; F16M 13/00; B60R 11/0241; B60R 2011/0056; F16B 47/00
USPC ...... 248/550, 683, 205.5, 206.2, 309.3, 362, 248/363
See application file for complete search history.

(56) References Cited

U.S. PATENT DOCUMENTS

| | | | |
|---|---|---|---|
| 11,635,106 B1 * | 4/2023 | Song ....................... | F16B 47/00 248/206.2 |
| 12,275,356 B1 * | 4/2025 | Zhao ....................... | B60R 11/02 |
| 12,332,512 B1 * | 6/2025 | Jirafe ................... | F16M 11/041 |
| 12,345,249 B1 * | 7/2025 | Yang ....................... | F04B 45/04 |
| 2006/0231705 A1 * | 10/2006 | Liu ........................ | F16B 47/00 248/205.5 |
| 2020/0191178 A1 | 6/2020 | Yang | |
| 2020/0252494 A1 | 8/2020 | Li et al. | |
| 2022/0042643 A1 * | 2/2022 | Rasmussen ........... | H02J 7/0042 |
| 2022/0060208 A1 * | 2/2022 | Wang ...................... | H04M 1/04 |
| 2022/0063513 A1 * | 3/2022 | Grant ..................... | H04N 23/52 |
| 2023/0269518 A1 * | 8/2023 | Cooper ................ | H04R 5/0335 381/374 |
| 2024/0102603 A1 * | 3/2024 | Hong ..................... | F16M 13/02 |
| 2024/0151346 A1 * | 5/2024 | Lu ............................ | A45F 3/16 |
| 2024/0344656 A1 * | 10/2024 | Jakobuco ............... | F16M 11/10 |

(Continued)

*Primary Examiner* — Muhammad Ijaz
(74) *Attorney, Agent, or Firm* — Hemisphere Law, PLLC

(57) ABSTRACT

The present disclosure discloses an automatic holder with a suction cup, including a holder main body; a power supply, a control circuit board, and an air extraction and bleeding device are fixed in the holder main body; a rubber suction cup is arranged at a bottom of the holder main body; an inner cavity of the rubber suction cup is communicated with the air extraction and bleeding device; a rotary suction member is arranged at a top of the holder main body; the rotary suction member is rotatable relative to the holder main body; the rotary suction member includes a ring-like main body; a ring-like groove is formed in the ring-like main body; an iron ring plate and a magnet ring are fixed in the ring-like groove; and the magnet ring is arranged on an outer side of the iron ring plate.

9 Claims, 4 Drawing Sheets

(56)        References Cited

U.S. PATENT DOCUMENTS

2024/0382020 A1*   11/2024   Jakobuco ................ H04M 1/04
2024/0401635 A1*   12/2024   Luo ...................... G03B 17/561

* cited by examiner

AUTOMATIC HOLDER WITH SUCTION CUP

TECHNICAL FIELD

The present disclosure relates to the technical field of mobile phone holders, and in particular, to an automatic holder with a suction cup.

BACKGROUND

There are many application places for mobile phone holders. For example, Chinese patent CN208638408U discloses a negative pressure fixed mobile phone holder for a vehicle. An orientation of the holder is adjusted by using a universal adjustment assembly composed of a universal adjustment fixing screw, a universal adjustment fixing nut, a universal adjustment ball, a spring locking button, and a fixed duckbill clip. The universal adjustment structure of the mobile phone holder has a complicated structure. Furthermore, when a suction surface of a mobile phone is not flat enough, under severe shaking, there is a risk that the mobile phone may be separated from a rubber suction cup.

SUMMARY

The present disclosure provides an automatic holder with a suction cup, and aims to solve the defects in the prior art above.

The objective of the present disclosure is achieved by the following technical solutions:

An automatic holder with a suction cup includes a holder main body; a power supply, a control circuit board, and an air extraction and bleeding device are fixed in the holder main body; a rubber suction cup is arranged at a bottom of the holder main body; an inner cavity of the rubber suction cup is communicated with the air extraction and bleeding device; a rotary suction member is arranged at a top of the holder main body; the rotary suction member is rotatable relative to the holder main body; the rotary suction member includes a ring-shaped main body; a ring-shaped groove is formed in the ring-shaped main body; an iron ring plate and a magnet ring are fixed in the ring-shaped groove and the magnet ring is arranged on an outer side of the iron ring plate.

Further, a mounting frame is fixed on the holder main body; a rotatable rotating shaft is arranged on the mounting frame; and a fixing frame configured to fix the rotating shaft is arranged on the ring-shaped main body.

Further, a protective cover is further arranged at the bottom of the holder main body; the protective cover sleeves the bottom of the rubber suction cup; and the protective cover is detachable at the bottom of the holder main body.

Further, a mounting seat is fixed inside the holder main body; the power supply, the control circuit board, and the air extraction and bleeding device are all fixed on the mounting seat; a cover plate is further arranged on the power supply, the control circuit board, and the air extraction and bleeding device; and the cover plate is fixed with the mounting seat.

Further, a start switch and a charging port are arranged on a side wall of the holder main body; the start switch s connected to the control circuit board; and the charging port is connected to the power supply.

Further, an air vent is formed in the middle of the rubber suction cup; a vent sleeve is arranged in the air vent; a bottom of the vent sleeve is communicated to the inner cavity of the rubber suction cup; and a top of the vent sleeve is connected to the air extraction and bleeding device.

Further, a first decorative member is fixed on the ring-shaped main body; and the first decorative member covers an outer side of the magnet ring.

Further, a second decorative member is fixed on a top surface of the holder main body.

Further, an antiskid sleeve sleeves the holder main body.

Beneficial effects of the present disclosure are as follows:

The automatic holder with the suction cup of the present disclosure is sucked by vacuum on glass of an automobile through the rubber suction cup. Meanwhile, a mobile phone is sucked onto the rotary suction member through the magnet ring, and the mobile phone can be adjusted at any position through the rotation of the rotary suction member. The suction is safe and reliable.

Figure 1:
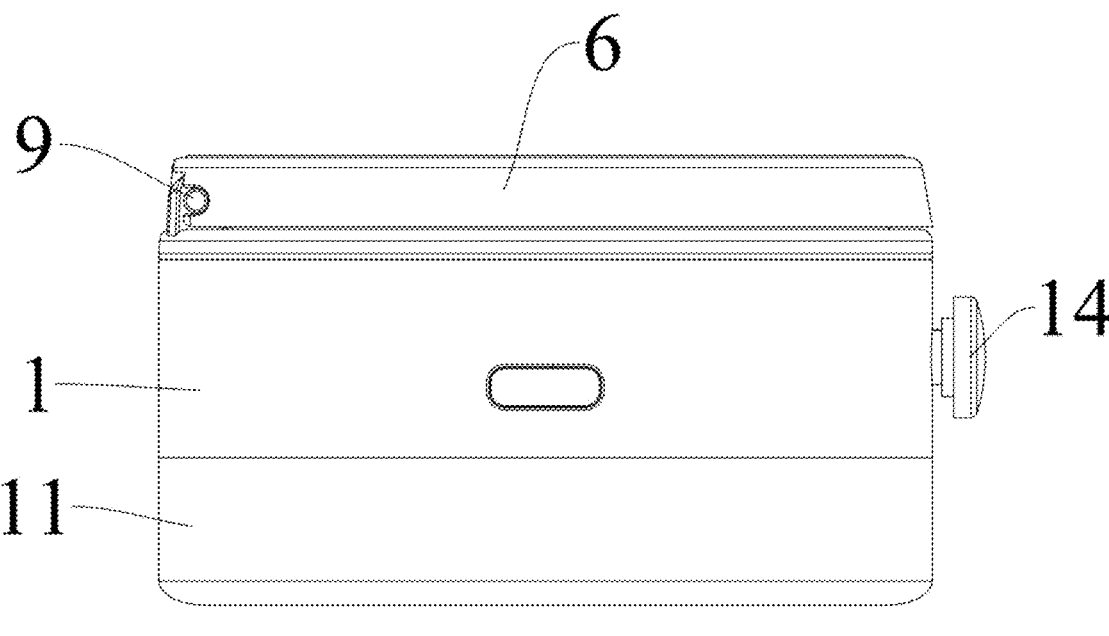
FIG. 1 is a schematic structural diagram of an automatic holder with the suction cup in the present disclosure.

In the drawings: 1: holder main body; 2: power supply; 3: control circuit board; 4: air suction and bleeding device; 5: rubber suction cup; 6: rotary suction member; 601: ring-shaped main body; 602: ring-shaped groove; 603: iron ring plate; 604: magnet ring; 7: antiskid sleeve; 8: mounting frame; 9: rotating shaft; 10: fixing frame; 11: protective cover; 12: mounting seat; 13: cover plate; 14: start switch; 15: charging port; 16: air vent; 17: vent sleeve; 18: first decorative member; and 19: second decorative member.

DETAILED DESCRIPTION OF THE EMBODIMENTS

In order to make the technical problems to be solved, technical solutions, and beneficial effects of the present disclosure clearer, the following is a further detailed explanation of the present disclosure in conjunction with the accompanying drawings and embodiments.

Figure 2:
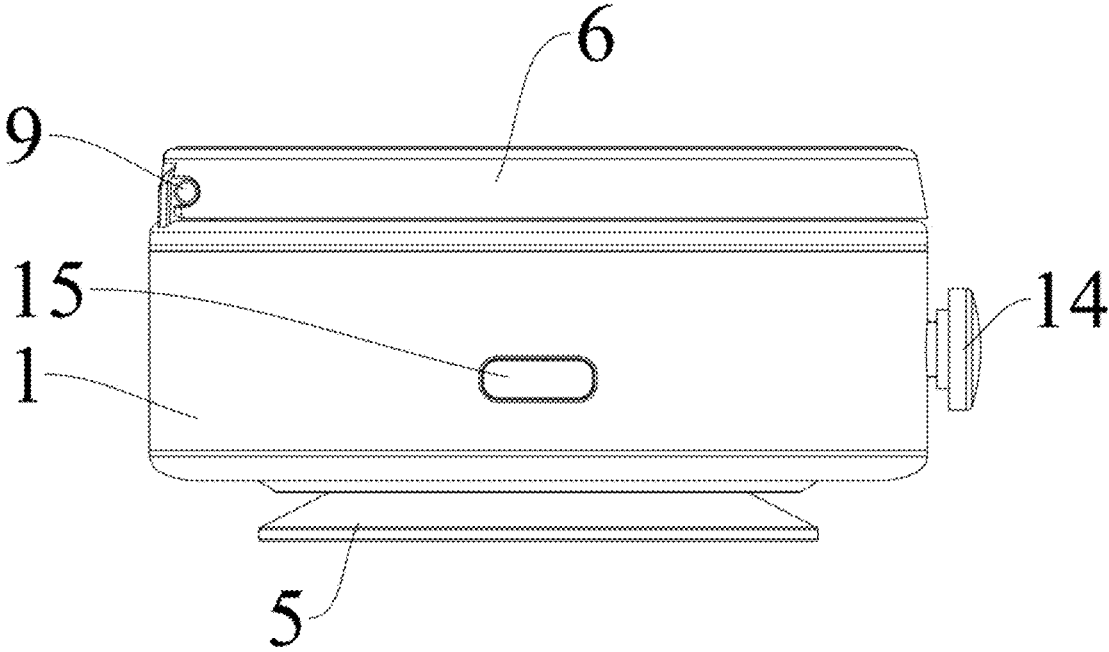
FIG. 2 is a schematic structural diagram of removing a protective cover from an automatic holder with the suction cup in the present disclosure.
Figure 3:
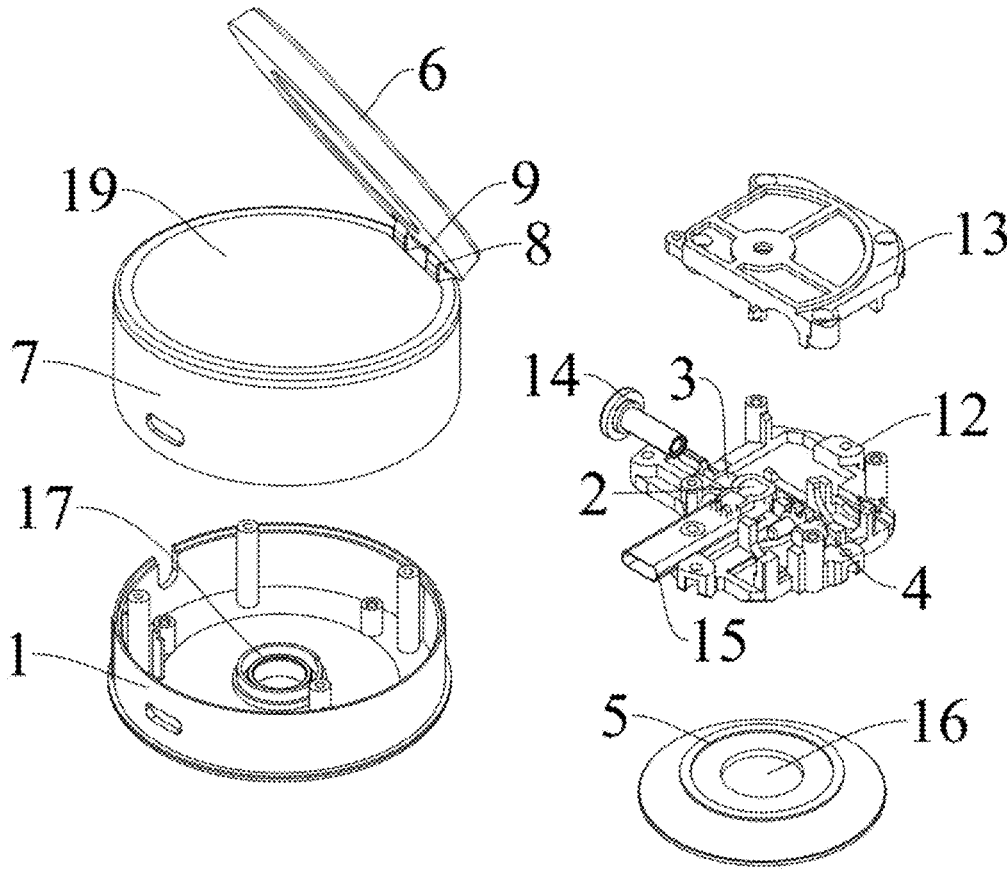
FIG. 3 is a structural exploded diagram of an automatic holder with the suction cup in the present disclosure.
Figure 4:
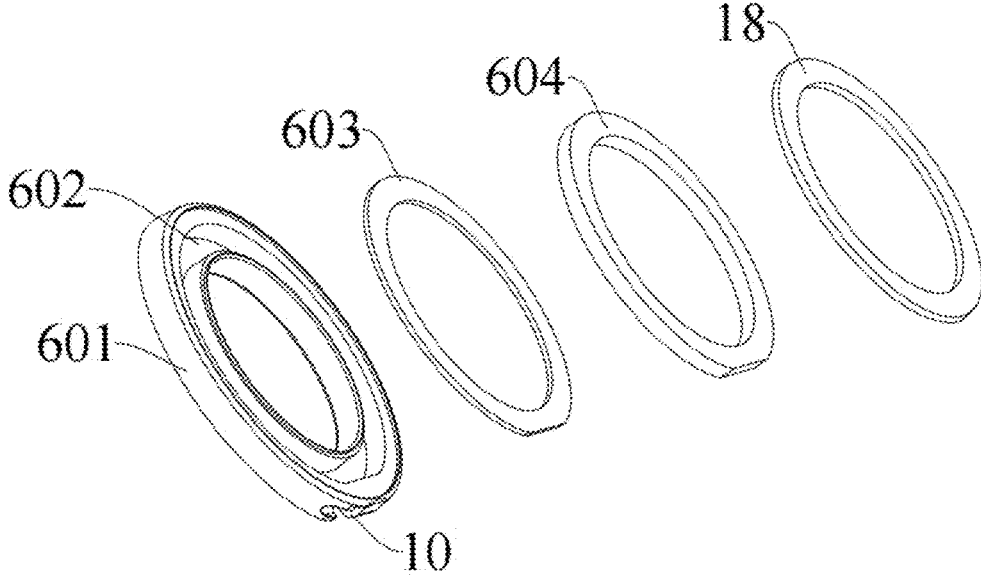
FIG. 4 is a structural exploded diagram of a rotary suction member in the present disclosure.

As shown in FIG. 1 to FIG. 4, the present disclosure provides an automatic holder with a suction cup, including a holder main body 1; a power supply 2, a control circuit board 3, and an air extraction and bleeding device 4 are fixed in the holder main body 1; a rubber suction cup 5 is arranged at a bottom of the holder main body 1; an inner cavity of the rubber suction cup 5 is communicated with the air extraction and bleeding device 4; a rotary suction member 6 is arranged at a top of the holder main body 1; the rotary suction member 6 is rotatable relative to the holder main body 1; the rotary suction member 6 includes a ring-shaped main body 601; a ring-shaped groove 602 is formed in the ring-shaped main body 601; an iron ring plate 603 and a magnet ring 604 are fixed in the ring-shaped groove 602; and the magnet ring 604 is arranged on an outer side of the iron ring plate 603.

The air extraction and bleeding device 4 and the power supply 2 are both electrically connected to the control circuit board 3. The power supply 2 is rechargeable. When the mobile phone holder needs to be used, the rubber suction cup 5 is first aligned with glass of an automobile. The air extraction and bleeding device 4 is then turned to start to extract air in the inner cavity of the rubber suction cup 5 until the rubber suction cup 5 is sucked onto the glass of the automobile by vacuum, and the position of the holder main body 1 is fixed. A back surface of a mobile phone is sucked onto the ring-shaped main body 601 through the magnet ring 604. Finally, the ring-shaped main body 601 is rotated according to a need until the mobile phone is rotated to a desired position to finally achieve in-vehicle fixing of the mobile phone.

The iron ring plate 603 is fixed in the ring-shaped groove 602. The magnet ring 604 is sucked onto the iron ring plate 603. There is a strong suction force between the magnet ring 604 and the iron ring plate 603 to ensure that the magnet ring 604 will not be separated from the ring-shaped groove 602.

A mounting frame 8 is fixed on the holder main body 1; a rotatable rotating shaft 9 is arranged on the mounting frame 8; and a fixing frame 10 configured to fix the rotating shaft 9 is arranged on the ring-shaped main body 601.

As a preference, the holder main body 1 is cylindrical. The mounting frame 8 is arranged at an edge position of a top of the holder main body 1. The ring-shaped main body 601 rotates with the rotating shaft 9. The ring-shaped main body 601 rotates using the rotating shaft 9 as a center relative to the holder main body 1. It should be noted that the rotating shaft 9 can be rotated only by an applied thrust, but will not rotate in a natural state or under a relatively low force, so that it ensures that the rotating shaft 9 may not rotate when an automobile is in driving, and the fixing position for the mobile phone is ensured.

A protective cover 11 is further arranged at the bottom of the holder main body 1; the protective cover 11 sleeves the bottom of the rubber suction cup 5; and the protective cover 11 is detachable at the bottom of the holder main body 1. A surface of the rubber suction cup 5 needs to be clean. When the mobile phone holder is not in use, the protective cover 11 covers the rubber suction cup 5 to: avoid the rubber suction cup 5 from being contaminated by dirt, avoid air from seeping into the inner cavity of the rubber suction cup 5, and prevent the rubber suction cup 5 to malfunction.

A mounting seat 12 is fixed inside the holder main body 1; the power supply 2, the control circuit board 3, and the air extraction and bleeding device 4 are all fixed on the mounting seat 12; a cover plate 13 is further arranged on the power supply 2, the control circuit board 3, and the air extraction and bleeding device 4; and the cover plate 13 is fixed with the mounting seat 12.

The power supply 2, the control circuit board 3, and the air extraction and bleeding device 4 are arranged between the mounting seat and the cover plate 13, and may not be in direct contact with an inner wall of the holder main body 1.

A start switch 14 and a charging port 15 are arranged on a side wall of the holder main body 1; the start switch 14 is connected to the control circuit board 3; and the charging port 15 is connected to the power supply 2.

The start switch 14 may be set to be a push type switch. The push type start switch 14 may achieve air extraction or air bleeding. The air extraction and bleeding device 4 is achieved through an air pump assembly, a cylinder assembly, and the like. The air extraction and bleeding device 4 is the prior art, such as, an air extraction and bleeding structure in Chinese patent CN218718121U, and will not be elaborated here.

An air vent 16 is formed in the middle of the rubber suction cup 5; a vent sleeve 17 is arranged in the air vent 16; a bottom of the vent sleeve 17 is communicated to the inner cavity of the rubber suction cup 5; and a top of the vent sleeve is connected to the air extraction and bleeding device 4. The vent sleeve 17 is fixed at the bottom of the holder main body 1. On the one hand, the vent sleeve is used as a carrier for communicating the inner cavity of the rubber suction cup 5 to the air extraction and bleeding device 4; and on the other hand, the vent sleeve can be used as a sealing ring to seal a hole passing through the holder main body 1.

A first decorative member 18 is fixed on the ring-shaped main body 601; and the first decorative member 18 covers an outer side of the magnet ring 604. A second decorative member 19 is fixed on a top surface of the holder main body 1. An antiskid sleeve 7 sleeves the holder main body 1. The first decorative member 18 and the second decorative member 19 can beautify the appearance. Meanwhile, the first decorative member 18 covers the magnet ring 604 and can avoid the magnet ring 604 from falling off and being abraded.

The automatic holder with the suction cup of the present disclosure is sucked by vacuum on glass of an automobile through the rubber suction cup 5. Meanwhile, a mobile phone is sucked onto the rotary suction member 6 through the magnet ring 604, and the mobile phone can be adjusted at any position through the rotation of the rotary suction member 6. The suction is safe and reliable.

The above describes the preferred embodiments of the present disclosure and is not intended to limit the present disclosure. Any modification, equivalent replacement, and improvement made within the spirit and scope of the present disclosure shall fall within the protection scope of the present disclosure.

What is claimed is:

1. An automatic holder with a suction cup, comprising a holder main body (1), wherein a power supply (2), a control circuit board (3), and an air extraction and bleeding device (4) are fixed in the holder main body (1); a rubber suction cup (5) is arranged at a bottom of the holder main body (1); an inner cavity of the rubber suction cup (5) is communicated with the air extraction and bleeding device (4); a rotary suction member (6) is arranged at a top of the holder main body (1); the rotary suction member (6) is rotatable relative to the holder main body (1); the rotary suction member (6) comprises a ring-shaped main body (601); a ring-shaped groove (602) is formed in the ring-shaped main body (601); an iron ring plate (603) and a magnet ring (604) are fixed in the ring-shaped groove (602); and the magnet ring (604) is arranged on an outer side of the iron ring plate (603).

2. The automatic holder with the suction cup according to claim 1, wherein a mounting frame (8) is fixed on the holder main body (1); a rotatable rotating shaft (9) is arranged on the mounting frame (8); and a fixing frame (10) configured to fix the rotating shaft (9) is arranged on the ring like-ring-shaped main body (601).

3. The automatic holder with the suction cup according to claim 1, wherein a protective cover (11) is further arranged at the bottom of the holder main body (1); the protective cover (11) sleeves the bottom of the rubber suction cup (5); and the protective cover (11) is detachable at the bottom of the holder main body (1).

4. The automatic holder with the suction cup according to claim 1, wherein a mounting seat (12) is fixed inside the holder main body (1); the power supply (2), the control circuit board (3), and the air extraction and bleeding device (4) are all fixed on the mounting seat (12); a cover plate (13) is further arranged on the power supply (2), the control circuit board (3), and the air extraction and bleeding device (4); and the cover plate (13) is fixed with the mounting seat (12).

5. The automatic holder with the suction cup according to claim 1, wherein a start switch (14) and a charging port (15) are arranged on a side wall of the holder main body (1); the start switch (14) is connected to the control circuit board (3); and the charging port (15) is connected to the power supply (2).

6. The automatic holder with the suction cup according to claim 1, wherein an air vent (16) is formed in the middle of the rubber suction cup (5); a vent sleeve (17) is arranged in the air vent (16); a bottom of the vent sleeve (17) is communicated to the inner cavity of the rubber suction cup (5); and a top of the vent sleeve is connected to the air extraction and bleeding device (4).

7. The automatic holder with the suction cup according to claim 1, wherein a first decorative member (18) is fixed on the ring-shaped main body (601); and the first decorative member (18) covers an outer side of the magnet ring (604).

8. The automatic holder with the suction cup according to claim 1, wherein a second decorative member (19) is fixed on a top surface of the holder main body (1).

9. The automatic holder with the suction cup according to claim 1, wherein an antiskid sleeve (7) sleeves the holder main body (1).

* * * * *